US008905221B2

(12) United States Patent
Young

(10) Patent No.: US 8,905,221 B2
(45) Date of Patent: Dec. 9, 2014

(54) CARTON STACKING APPARATUS AND METHODS

(75) Inventor: Todd Young, Brandon, MN (US)

(73) Assignee: Douglas Machine Inc., Alexandria, MN (US)

( * ) Notice: Subject to any disclaimer, the term of this patent is extended or adjusted under 35 U.S.C. 154(b) by 119 days.

(21) Appl. No.: 13/581,811

(22) PCT Filed: Feb. 28, 2011

(86) PCT No.: PCT/US2011/026401
§ 371 (c)(1),
(2), (4) Date: Aug. 30, 2012

(87) PCT Pub. No.: WO2011/109256
PCT Pub. Date: Sep. 9, 2011

(65) Prior Publication Data
US 2012/0318638 A1 Dec. 20, 2012

Related U.S. Application Data

(60) Provisional application No. 61/309,014, filed on Mar. 1, 2010.

(51) Int. Cl.
*B65G 47/26* (2006.01)
*B65G 57/30* (2006.01)
(52) U.S. Cl.
CPC .................................. *B65G 57/308* (2013.01)
USPC ......... 198/435; 198/347.1; 198/607; 414/790
(58) Field of Classification Search
USPC ................ 198/347.1, 435, 465.1, 607, 626.1,
198/626.3; 414/790, 794.4, 788.1, 788.8,
414/789.9
See application file for complete search history.

(56) References Cited

U.S. PATENT DOCUMENTS

| 5,088,883 | A  | * | 2/1992  | Focke et al. .................... 414/795 |
| 6,135,705 | A  | * | 10/2000 | Katoch .......................... 414/795 |
| 7,156,607 | B2 | * | 1/2007  | Anderson et al. ............. 414/790 |
| 7,740,123 | B2 | * | 6/2010  | Lopez Fernandez et al. .......................... 198/418.5 |
| 8,061,504 | B2 | * | 11/2011 | Wi .............................. 198/418.6 |
| 2005/0074321 | A1 |  | 4/2005 | Anderson et al. |
| 2006/0263193 | A1 |  | 11/2006 | Furthmuller |

FOREIGN PATENT DOCUMENTS

DE 2101461 A1 8/1972
JP 2006264951 10/2006

* cited by examiner

*Primary Examiner* — James R Bidwell
(74) *Attorney, Agent, or Firm* — Alan Kamrath; KAMRATH IP Law Firm, P.A.

(57) ABSTRACT

An apparatus for stacking items (I) includes first and second pluralities of stacker shelves (22) extending towards each other in spaced and parallel operative sections and each moving along first and second endless paths. The stacker shelves (22) are switchable by a switch (350) between extended and retracted positions. The stacker shelves (22) in retracted positions in the operative sections are operatively spaced from the item (I) received on the corresponding stacker shelves (22) in extended positions. In preferred aspects, the stacker shelves (22) are slideable relative to first and second plurality of carriers (310) carried along the first and second endless paths by roller chains (304). The switch (350) switches a cam follower (328) on each of the stacker shelves (22) into one of first and second cam tracks (342, 344) as the stacker shelves (22) enter the operative sections of the endless paths.

20 Claims, 4 Drawing Sheets

US 8,905,221 B2

CARTON STACKING APPARATUS AND METHODS

CROSS REFERENCE

The present application claims benefit of U.S. Provisional Appln. No. 61/309,014 filed on Mar. 1, 2010.

BACKGROUND

The present invention generally relates to improved carton stacking apparatus and methods and particularly relates to carton stacking apparatus and methods accommodating items of differing heights.

U.S. Pat. No. 7,156,607 has achieved market success within the packaging industry to stack items of various sizes and pack patterns. Although adjustable to accommodate items of differing width, a need has been recognized to better accommodate items of differing heights. Specifically, as the ratio of the vertical spacing between the stacking shelves versus the height of the product increased, issues of items catching or getting stuck in catch points when dropping down a level did arise. Thus, a need exists for stacking apparatus and methods allowing adjustment according to the heights of the items being stacked.

SUMMARY

The present invention solves this need and other problems in the field of carton stacking by providing, in a preferred form, first and second pluralities of stacker shelves each moving along first and second endless paths. The endless paths include spaced and parallel operative sections, with the stacker shelves extending towards each other in the operative sections. The stacker shelves are switchable between an extended position and a retracted position in the operative sections, with a spacing between the stacker shelves in the operative sections being less in extended positions than in retracted positions. The stacker shelves in retracted positions in the operative sections are operatively spaced from the item received on the corresponding stacker shelves in extended positions.

In most preferred forms, the first and second pluralities of stacker shelves are slideable relative to first and second plurality of carriers carried along the first and second endless paths by roller chains. A switch switches a cam follower on each of the first and second pluralities of stacker shelves into one of first and second cam tracks as the first and second pluralities of stacker shelves enter the operative sections of the endless paths.

The present invention will become clearer in light of the following detailed description of illustrative embodiments of this invention described in connection with the drawings.

DESCRIPTION OF DRAWINGS

The illustrative embodiments may best be described by reference to the accompanying drawings where.

Figure 1:
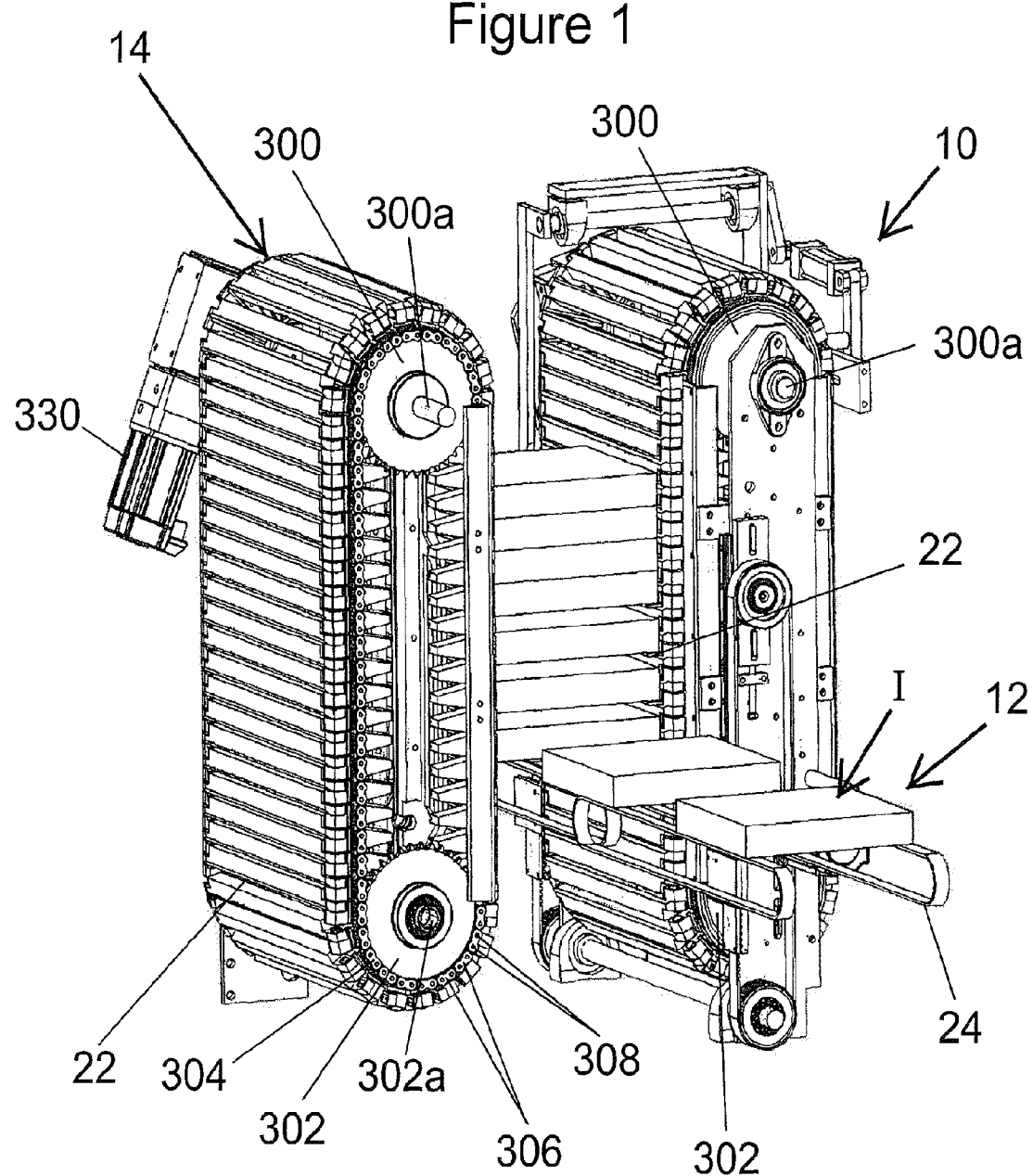
FIG. 1 shows a diagrammatic perspective view of a carton stacking apparatus utilizing methods according to the preferred teachings of the present invention, with portions removed to show constructional details.
Figure 2:
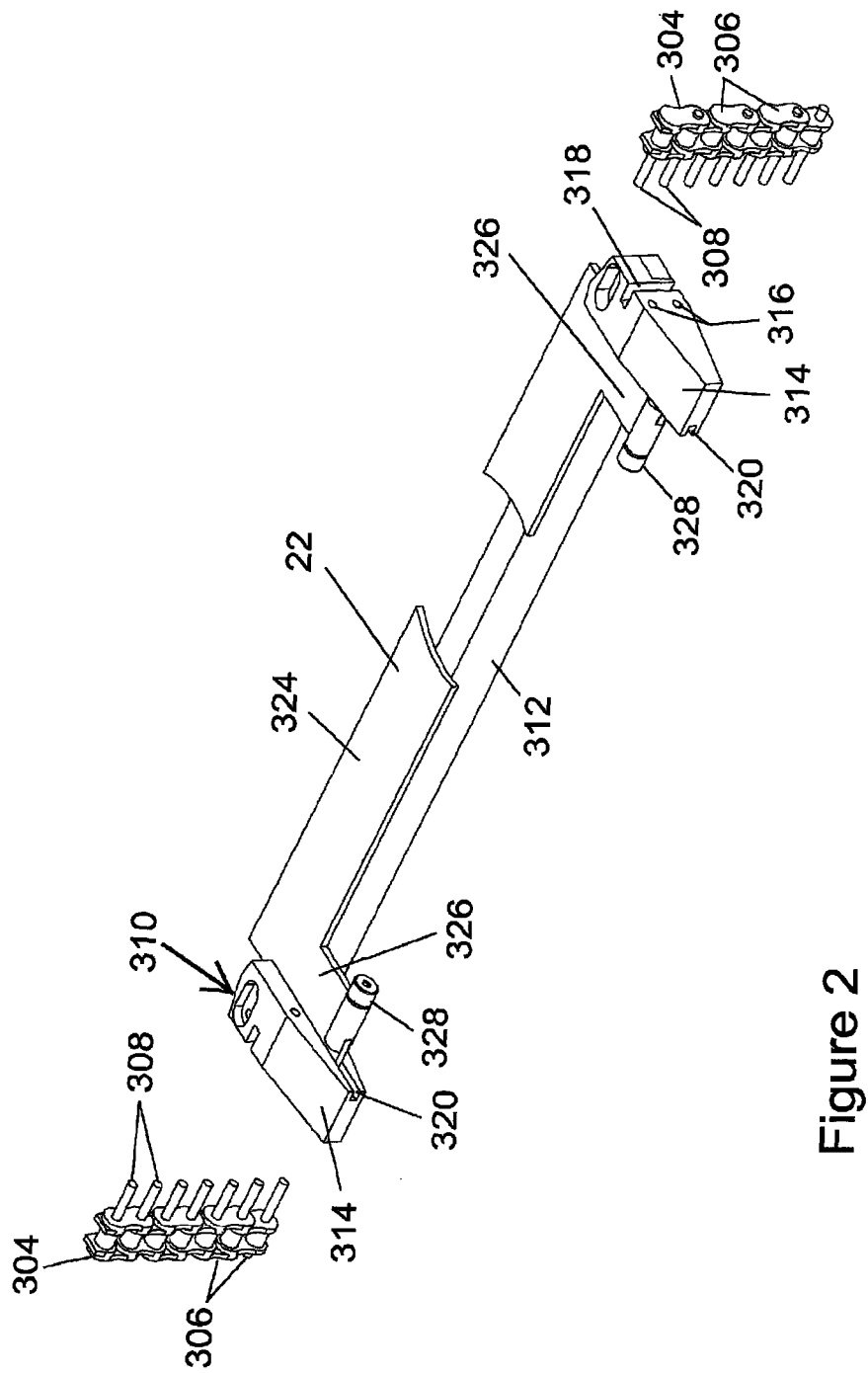
FIG. 2 shows a partial, exploded perspective view of the stacking mechanism of the apparatus of FIG. 1, with portions removed to show constructional details.
Figure 3:
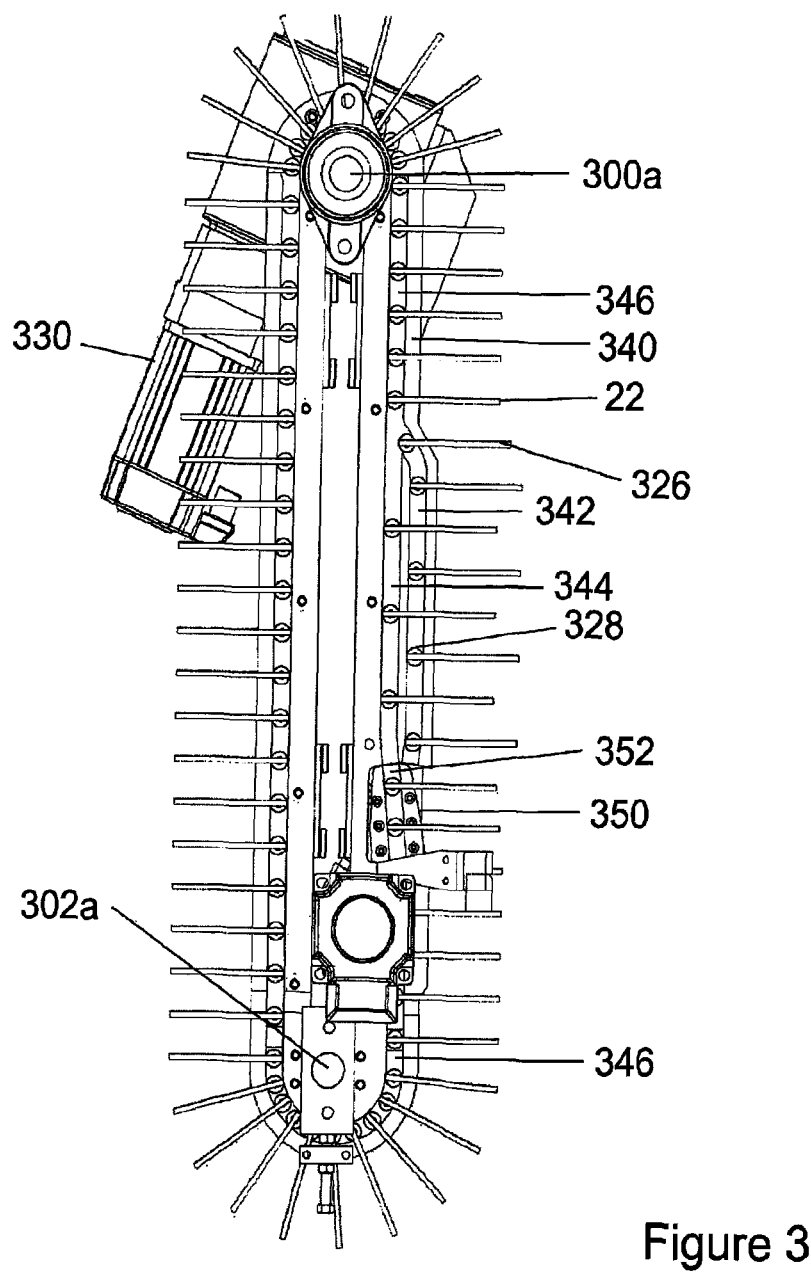
FIG. 3 shows a partial, side view of the stacking mechanism of the apparatus of FIG. 1, with portions removed to show constructional details.
Figure 4:
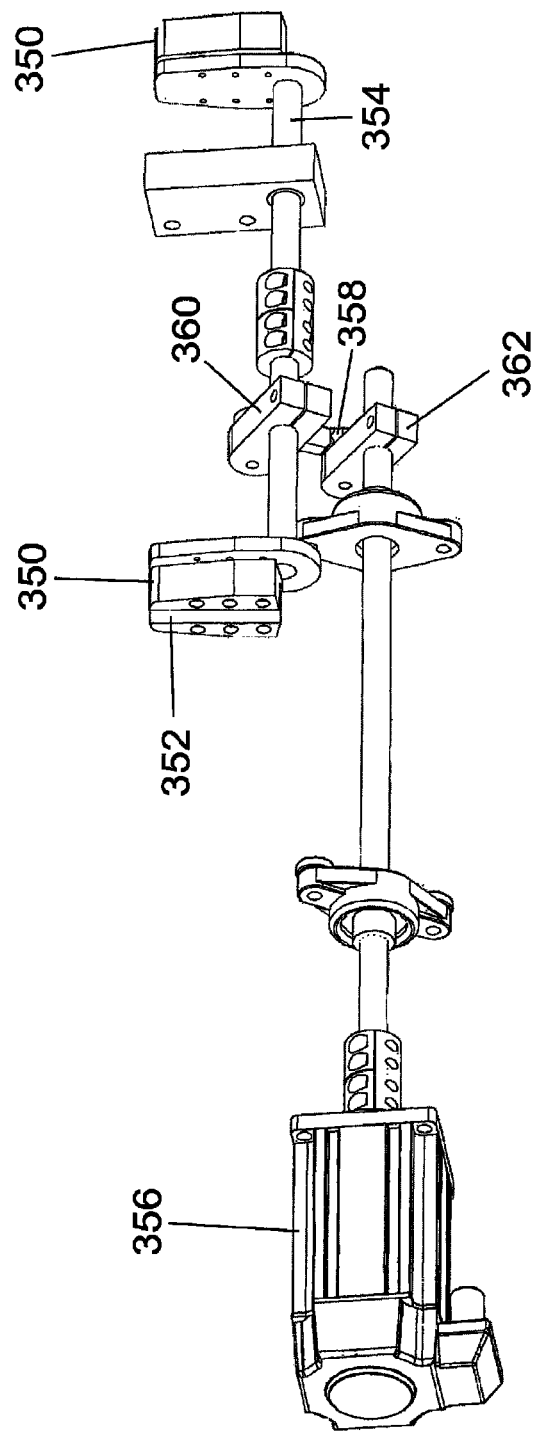
FIG. 4 shows a partial, perspective view of the stacking mechanism of the apparatus of FIG. 1, with portions removed to show constructional details.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for stacking items according to the preferred teachings of the present invention is shown in the drawings and generally designated 10. Apparatus 10 is generally of the type shown and described in U.S. Pat. No. 7,156,607, which is hereby incorporated herein by reference. Generally, apparatus 10 includes a receiving mechanism 12 for receiving incoming items I, such as, but not limited to, cartons, and a stacking mechanism 14 for receiving items I from the receiving mechanism 12. Stacking mechanism 14 includes a plurality of moving stacker shelves 22. Receiving mechanism 12 includes a conveyor 24 tracking the motion of the moving stacker shelves 22. The moving stacker shelves 22 retract sequentially to stack items I.

According to the teachings of the present invention, moving stacker shelves 22 act in pairs to support one layer of items I. In particular, stacking mechanism 14 includes a suitable mechanism for moving stacker shelves 22 along first and second endless paths each including parallel, spaced operative sections. In the preferred form shown, stacking mechanism 14 includes first and second pairs of sprockets 300 and 302 rotatable about axles 300a and 302a and around which roller chains 304 extend. Each roller chain 304 includes a plurality of links 306 pivotally interconnected by pins 308. In the embodiment shown, pins 308 extend in an axial direction parallel to axles 300a and 302a of sprockets 300 and 302 outwardly of links 306. Conventionally, links 306 receive teeth of sprockets 300 and 302 to provide a gearing relation therebetween, with at least one of the pair of sprockets 300 and 302 being driven such as by a servo motor 330.

According to the preferred teachings of the present invention, stacking mechanism 14 includes a plurality of carriers 310 each of a generally U-shape. Specifically, each carrier 310 includes a brace 312 extending between first and second mounts 314 extending in a spaced, parallel manner. The outer surfaces of mounts 314 include first and second receptacles 316 for slideable receipt of two adjacent pins 308 of roller chains 304. The outer surfaces of mounts 314 also include a channel 318 for slideable receipt of a stationery track around sprockets 300 and 302 and defining the endless paths of the moving stacker shelves 22. The inner surfaces of mounts 314 include slots 320 for slideably receiving one of the stacker shelves 22.

In the embodiment shown, each stacker shelf 22 is generally C-shaped and includes a supporting portion 324 extending between first and second legs 326 extending in a spaced, parallel manner. The outer edges of legs 326 are slideably received in slots 320 of mounts 314. Cam followers 328 extend in the axial direction from the inner edges of legs 326 in a spaced, parallel relation to supporting portion 324. Each stacker shelf 22 is slideable between an extended position and a retracted position relative to carrier 310.

According to the preferred teachings of the present invention, stacking mechanism 14 further includes a pair of cams 340 extending parallel to, but spaced from, roller chains 304. Generally, each cam 340 includes first and second cam tracks 342 and 344 in a spaced, parallel relation in the operative section of the endless path. In the preferred form, first and second cam tracks 342 and 344 merge together when leaving the operative section of the endless path such as into cam track 346 located outside of the operative section of the endless path. In the preferred form, cam tracks 342 and 344 merging into cam track 346 have a generally Y-shape. Each cam 340 further includes a switch 350 having a switch cam track 352. The inlet of switch cam track 352 is aligned with cam track 346. Switch 350 is movable between an extended position with the outlet of switch cam track 352 aligned with first cam track 342 and a retracted position with the outlet of switch cam track 352 aligned with second cam track 344. It should be appreciated that cam track 346 can be continuous or discontinuous between the outlets of cam tracks 342 and 344 and the inlet of switch cam track 352 of switch 350.

In the form shown, each switch 350 of the pair of cams 340 is fixed to opposite ends of a rotatably mounted shaft 354. Shaft 354 is suitably rotated such as by a servo motor 356. Specifically, in the preferred form shown, a turnbuckle 358 has its opposite ends pivotally connected to crank arms 360 and 362 respectively rotatably fixed to shaft 354 and the output of servo motor 356.

Now that the basic construction of apparatus 10 of a preferred form has been set forth according to the teachings of the present invention, a method of operation and some of the features of the present application can be highlighted. Specifically, at least one of axles 300a and 302a is suitably rotated such as by servo motor 330. Rotation of one of axles 300a and 302a rotates sprockets 300 and 302 causing roller chains 304 to move along the endless path. Since carriers 310 are secured by pins 308 to roller chains 304, carriers 310 as well as stacker shelves 22 slideably received therein also move along the endless paths and relative to the cams 340. Since cam followers 328 are mounted to stacker shelves 22, movement of stacker shelves 22 relative to cams 340 cause cam followers 328 to move in cam tracks 346 and 352 and one of cam tracks 342 and 344 depending upon the positioning of switches 350. The spacing between the corresponding pair of stacker shelves 22 is less when cam followers 328 move in first cam track 342 and is greater when cam followers 328 move in second cam track 344. The spacing of stacker shelves 22 in the extended position is less than the width of items I and in the retracted position is greater than the width of items I so as to be operationally spaced from item I received on corresponding stacker shelves 22 in extended positions. Thus, it can be appreciated that if items I have a height greater than the distance between stacker shelves 22 in the operative sections of the endless path, one or more pairs of stacker shelves 22 in the endless path after a pair of stacker shelves 22 in extended positions can be in retracted positions to accommodate items I of different heights.

It can then be appreciated that stacking mechanism 14 can receive items I from receiving mechanism 12 according to the operation set forth in U.S. Pat. No. 7,156,607.

It can be appreciated that apparatus 10 according to the teachings of the present invention is easily adjustable to accommodate items I of differing heights. Specifically, if items I have a height less than the vertical spacing between stacker shelves 22 in the operative sections, switch 350 is positioned in the extended position such that all cam followers 328 travel into cam track 342 such that all stacker shelves 22 are in extended positions to receive items I. However, if items I have a height greater than the vertical spacing between stacker shelves 22 in the operative sections but less than double the vertical spacing, switch 350 is moved by servo motor 356 such that alternate cam followers 328 travel into first and second cam tracks 342 and 344 such that alternate stacker shelves 22 are in the extended positions to received items I and alternate stacker shelves 22 are in the retracted positions to be operatively spaced from items I supported on the stacker shelves 22 in the extended positions. Likewise, if items I have a height greater than double the vertical spacing between stacker shelves 22 in the operative section, switch 350 is moved by servo motor 356 such that the desired number of cam followers 328 travel into first and second cam tracks 342 and 344 such that stacker shelves 22 in the extended positions are suitably vertically spaced to receive such items I. Thus, by merely changing the electronic control of servo motor 356, items I of differing heights can be accommodated by apparatus 10 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. Method for stacking comprising:
moving first and second pluralities of stacker shelves each along first and second endless paths, with each of the first and second endless paths including an operative section, with the operative sections being spaced and parallel, with the first and second plurality of stacker shelves extending towards each other in the operative sections, with the stacker shelves having an extended position and a retracted position in the operative sections, with a spacing between the stacker shelves in the operative sections being less in the extended position than in the retracted position;
positioning corresponding stacker shelves in either the extended or the retracted positions in the operative sections;
receiving an item on the corresponding stacker shelves in the extended positions in the operative sections with the item positioned vertically above and between the corresponding stacker shelves in the extended positions, with the stacker shelves in the retracted positions positioned vertically within a vertical extent of the item positioned on the corresponding stacker shelves in the extended position and in the operative sections being operatively spaced from the item received on the corresponding stacker shelves in the extended positions; and sequentially retracting the stacker shelves in the endless paths to stack the item.

2. The method of claim 1 wherein moving the first and second pluralities of stacker shelves comprises moving first and second plurality of carriers each along the first and second endless paths; and wherein positioning corresponding stacker shelves comprises sliding the first and second pluralities of stacker shelves relative to the first and second plurality of carriers moving along the first and second endless paths.

3. A method for stacking comprising:

moving first and second pluralities of stacker shelves each along first and second endless paths, with each of the first and second endless paths including an operative section, with the operative sections being spaced and parallel, with the first and second plurality of stacker shelves extending towards each other in the operative sections, with the stacker shelves having an extended position and a retracted position in the operative sections, with a spacing between the stacker shelves in the operative sections being less in the extended position than in the retracted position;

positioning corresponding stacker shelves in either the extended or the retracted positions in the operative sections;

receiving an item on the corresponding stacker shelves in the extended positions in the operative sections, with the stacker shelves in the retracted positions in the operative sections being operatively spaced from the item received on the corresponding stacker shelves in the extended positions; and sequentially retracting the stacker shelves in the endless paths to stack the item;

wherein moving the first and second pluralities of stacker shelves comprises moving first and second plurality of carriers each along the first and second endless paths;

wherein positioning corresponding stacker shelves comprises sliding the first and second pluralities of stacker shelves relative to the first and second plurality of carriers moving along the first and second endless paths; and wherein sliding the first and second pluralities of stacker shelves comprises providing a cam follower on each of the first and second pluralities of stacker shelves; providing first and second cam tracks in each of the operative sections of the stacker sections; and switching the cam follower into one of the first and second cam tracks as the first and second pluralities of stacker shelves enter the operative sections of the endless paths.

4. The method of claim 3 wherein moving the first and second pluralities of carriers comprises moving first and second pairs of a roller chains along the first and second endless paths, with the roller chains each including a plurality of links pivotally interconnected by pins, with the pins slideably received in receptacles formed in the first and second pluralities of carriers.

5. The method of claim 4 wherein moving the first and second pluralities of carriers comprises providing carriers each of a generally U-shape and including a brace extending between first and second mounts, with each of the mounts having an outer surface including the receptacles, with each of the mounts having an inner surface including a slot slideably receiving one of the stacker shelves.

6. The method of claim 5 wherein sliding the first and second pluralities of stacker shelves comprises sliding the first and second pluralities of stacker shelves wherein each stacker shelf is generally C-shaped and includes a supporting portion extending between first and second legs, with outer edges of the first and second legs slideably received in the slots of the first and second mounts, with the cam follower being provided on each of the first and second legs parallel to and spaced from the supporting portion.

7. The method of claim 6 wherein switching the cam follower comprises rotating a switch having a cam track including an inlet and an outlet, with the switch movable between an extended position with the outlet aligned with the first cam track and a retracted position with the outlet aligned with the second cam track.

8. The method of claim 7 wherein rotating the switch comprises rotationally mounting a shaft interconnecting a pair of switches; activating a servo motor having an output; and providing a turnbuckle pivotally connected between a crank arm fixed to the shaft and a crank arm fixed to the output of the servo motor.

9. The method of claim 8 wherein moving the first and second pluralities of stacker shelves comprises moving the first and second pluralities of stacker shelves in the retracted position in the first and second endless paths outside of the operative sections.

10. The method of claim 4 wherein moving the first and second pluralities of carriers comprises providing carriers each of a generally U-shape and including a brace extending between first and second mounts, with each of the mounts having an inner surface including a slot slideably receiving one of the stacker shelves.

11. Apparatus for stacking items comprising, in combination:

first and second pluralities of stacker shelves each moving along first and second endless paths, with each of the first and second endless paths including an operative section, with the operative sections being spaced and parallel, with the first and second plurality of stacker shelves extending towards each other in the operative sections, with the stacker shelves having an extended position and a retracted position in the operative sections, with a spacing between the stacker shelves in the operative sections being less in the extended position than in the retracted position;

a mechanism receiving an item and transferring the item to the corresponding stacker shelves in the extended positions in the operative sections, with the stacker shelves in the retracted positions positioned vertically within a vertical extent of the item positioned on the corresponding stacker shelves in the extended positions and in the operative sections being operatively spaced from the item received on the corresponding stacker shelves in the extended positions; and a switch positioning corresponding stacker shelves in either the extended or the retracted positions in the operative sections before the item is transferred by the mechanism.

12. The apparatus of claim 11 further comprising, in combination: first and second plurality of carriers each moving along the first and second endless paths, with the first and second pluralities of stacker shelves being slideable relative to the first and second plurality of carriers moving along the first and second endless paths.

13. An apparatus for stacking items comprising, in combination:

first and second pluralities of stacker shelves each moving along first and second endless paths, with each of the first and second endless paths including an operative section, with the operative sections being spaced and parallel, with the first and second plurality of stacker shelves extending towards each other in the operative sections, with the stacker shelves having an extended position and a retracted position in the operative sections, with a spacing between the stacker shelves in the operative sections being less in the extended position than in the retracted position;

a switch positioning corresponding stacker shelves in either the extended or the retracted positions in the operative sections;

a mechanism receiving an item and transferring the item to the corresponding stacker shelves in the extended positions in the operative sections, with the stacker shelves in the retracted positions in the operative sections being operatively spaced from the item received on the corresponding stacker shelves in extended positions;

first and second plurality of carriers each moving along the first and second endless paths, with the first and second pluralities of stacker shelves being slideable relative to the first and second plurality of carriers moving along the first and second endless paths;

a cam follower on each of the first and second pluralities of stacker shelves; and first and second cam tracks in each of the operative sections of the stacker sections, with the switch switching the cam follower into one of the first and second cam tracks as the first and second pluralities of stacker shelves enter the operative sections of the endless paths.

14. The apparatus of claim 13 further comprising, in combination: first and second pairs of a roller chains moving along the first and second endless paths, with the roller chains each including a plurality of links pivotally interconnected by pins, with the pins slideably received in receptacles formed in the first and second pluralities of carriers.

15. The apparatus of claim 14 wherein each of the first and second pluralities of carriers is of a generally U-shape and includes a brace extending between first and second mounts, with each of the mounts having an outer surface including the receptacles, with each of the mounts having an inner surface including a slot slideably receiving one of the stacker shelves.

16. The apparatus of claim 15 wherein each of the first and second pluralities of stacker shelves is generally C-shaped and includes a supporting portion extending between first and second legs, with outer edges of the first and second legs slideably received in the slots of the first and second mounts, with the cam follower being provided on each of the first and second legs parallel to and spaced from the supporting portion.

17. The apparatus of claim 16 wherein the switch has a cam track including an inlet and an outlet, with the switch rotatable between an extended position with the outlet aligned with the first cam track and a retracted position with the outlet aligned with the second cam track.

18. The apparatus of claim 17 further comprising, in combination: a shaft interconnecting a pair of switches; a servo motor having an output; and a turnbuckle pivotally connected between a crank arm fixed to the shaft and a crank arm fixed to the output of the servo motor.

19. The apparatus of claim 18 wherein the first and second pluralities of stacker shelves are in the retracted position in the first and second endless paths outside of the operative sections.

20. The apparatus of claim 14 wherein each of the first and second pluralities of carriers is of a generally U-shape and includes a brace extending between first and second mounts, with each of the mounts having an inner surface including a slot slideably receiving one of the stacker shelves.

* * * * *